(12) United States Patent
Janawitz et al.

(10) Patent No.: US 8,038,776 B2
(45) Date of Patent: *Oct. 18, 2011

(54) APPARATUS FOR FILTERING GAS TURBINE INLET AIR

(75) Inventors: Jamison W. Janawitz, Overland Park, KS (US); Bradley S. Rogers, Leawood, KS (US); James Easel Roberts, Kansas City, MO (US); Thomas Shannon Eckhoff, Kansas City, MO (US); Robert W. Taylor, Ponte Vedra Beach, FL (US)

(73) Assignee: BHA Group, Inc., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/729,831

(22) Filed: Mar. 23, 2010

(65) Prior Publication Data
US 2010/0175389 A1 Jul. 15, 2010

Related U.S. Application Data

(63) Continuation-in-part of application No. 12/046,773, filed on Mar. 12, 2008, now Pat. No. 7,695,551.

(51) Int. Cl.
*B03C 3/155* (2006.01)
(52) U.S. Cl. .................. 96/66; 55/361; 60/275
(58) Field of Classification Search .......... 96/55, 57–60, 96/64, 66; 55/361, 378, 379; 95/69, 78; 60/275

See application file for complete search history.

(56) References Cited

U.S. PATENT DOCUMENTS

| | | | |
|---|---|---|---|
| 3,425,189 A | 2/1969 | Haselmayer | |
| 4,251,234 A | 2/1981 | Chang | |
| 4,354,858 A | 10/1982 | Kumar et al. | |
| 4,544,383 A | 10/1985 | Haselmaker | |
| 5,024,681 A | 6/1991 | Chang | |
| 5,156,658 A | 10/1992 | Riehl | |
| 5,158,580 A | 10/1992 | Chang | |
| 5,217,511 A | 6/1993 | Plaks et al. | |
| 5,938,818 A | 8/1999 | Miller | |
| 5,961,693 A | 10/1999 | Altman et al. | |
| 6,152,988 A | 11/2000 | Plaks et al. | |
| 6,235,090 B1 | 5/2001 | Berstein et al. | |

(Continued)

FOREIGN PATENT DOCUMENTS

JP 6084167 A 5/1985

OTHER PUBLICATIONS

Materials System Specification, Document Responsibility: Gas Turbine Diesel Engines, pp. 1-24 (Issue Date: Oct. 26, 2005).

*Primary Examiner* — Richard L Chiesa
(74) *Attorney, Agent, or Firm* — Armstrong Teasdale LLP

(57) ABSTRACT

An inlet air filtration system for a gas turbine includes, in an exemplary embodiment, an air plenum, and a plurality of filter elements mounted inside the air plenum, with each filter element including a support structure. The inlet air filtration system also includes a plurality of electrodes positioned proximate the plurality of filter elements, where the electrodes are coupled to a power source which supplies a voltage to the electrodes. The voltage is sufficient to establish an electrostatic field between the electrodes and the filter elements, and is sufficient to produce a corona discharge from the electrodes, wherein an amount of current applied to the filter elements is about 0.1 $\mu A/ft^2$ to about 15 $\mu A/ft^2$.

18 Claims, 4 Drawing Sheets

U.S. PATENT DOCUMENTS

| | | |
|---|---|---|
| 6,514,315 B1 | 2/2003 | Chang |
| 6,544,317 B2 | 4/2003 | Miller |
| 6,602,328 B2 | 8/2003 | Doi et al. |
| 6,766,636 B2 | 7/2004 | Shingu et al. |
| 6,869,467 B2 | 3/2005 | Scheuch |
| 6,964,698 B1 | 11/2005 | Davis et al. |
| 6,986,803 B1 | 1/2006 | Richards |
| 7,022,166 B2 | 4/2006 | Gittler |
| 7,527,674 B1 | 5/2009 | Janawitz et al. |
| 7,695,551 B2 * | 4/2010 | Janawitz et al. .................. 96/66 |
| 2003/0159585 A1 * | 8/2003 | Gittler ................ 96/64 |
| 2003/0177901 A1 * | 9/2003 | Krigmont .......... 95/78 |
| 2004/0025690 A1 * | 2/2004 | Krigmont .......... 95/78 |
| 2009/0229468 A1 * | 9/2009 | Janawitz et al. .................. 96/55 |

* cited by examiner

APPARATUS FOR FILTERING GAS TURBINE INLET AIR

CROSS REFERENCE TO RELATED APPLICATIONS

This application is a Continuation-In-Part of U.S. patent application Ser. No. 12/046,773, filed on Mar. 12, 2008, now U.S. Pat. No. 7,695,551, and which is hereby incorporated by reference in its entirety.

BACKGROUND OF THE INVENTION

The field of the invention relates generally to a filtration method and system for removing particulate matter from a gas turbine air intake, and more particularly, to a filtration method and system that includes filter elements and discharging electrostatic electrodes for removing particulate matter from the gas turbine air intake.

Fabric filtration is a common technique for separating out particulate matter in an air stream. Fabric filtration is often accomplished in a device known as a baghouse. Known baghouses include a housing that has an inlet for receiving dirty, particulate-containing air and an outlet through which clean air leaves the baghouse. The interior of the housing is divided by a tube sheet into a dirty air or upstream plenum and a clean air or downstream plenum, with the dirty air plenum in fluid communication with the inlet and the clean air plenum in fluid communication with the outlet. The tube sheet typically includes a number of apertures and supports a number of filter elements with each filter element covering one of the apertures.

Known filter elements can include a support structure and a fabric filter media. The support structure, which is also called a core, typically has a cylindrical shape and is hollow. The walls of the support structure may be similar to a screen or a cage, or may simply include a number of perforations, so that a fluid can pass through the support structure. The support structure has at least one end that is open and that is capable of being coupled to the tube sheet at an aperture. The support structure extends from the tube sheet into the dirty air plenum. There are several types of fabric filter media. A "bag" filter media is flexible and/or pliable and is shaped like a bag. A cartridge filter media is relatively rigid and pleated. The filter media is mounted around the exterior or outer portion of the support structure.

During use, as particulate matter accumulates or cakes on the filters, the flow rate of the air is reduced and the pressure drop across the filters increases. To restore the desired flow rate, a reverse pressure pulse is applied to the filters. The reverse pressure pulse separates the particulate matter from the filter media, which then falls to the lower portion of the dirty air plenum.

An electrostatic device, such as an electrostatic precipitator, can also be used for separating particulate matter from an air stream. In an electrostatic precipitator, particulate matter is electronically charged and then collected through the action of an electric field. An electrostatic precipitator includes a discharge electrode that is maintained at a high voltage and a non-discharge electrode that is maintained at a relatively lower voltage or at ground. As the particulate-containing air steam flows past the electrodes, the electric field present between the electrodes operates to charge a percentage of the passing particles and causes them to collect on the non-discharge electrode.

BRIEF DESCRIPTION OF THE INVENTION

In one aspect, an inlet air filtration system for a gas turbine is provided. The inlet air filtration system includes an air plenum, and a plurality of filter elements mounted inside the air plenum, with each filter element including a support structure. The inlet air filtration system also includes a plurality of electrodes positioned proximate the plurality of filter elements, where the electrodes are coupled to a power source which supplies a voltage to the electrodes. The voltage is sufficient to establish an electrostatic field between the electrodes and the filter elements, and sufficient to produce a corona discharge from the electrodes, wherein an amount of current applied to the filter elements is about 0.1 $\mu A/ft^2$ to about 15 $\mu A/ft^2$.

In another embodiment, a gas turbine apparatus is provided that includes a compressor, an air inlet coupled to the compressor, a combustor coupled to the compressor, a turbine coupled to the combustor, an exhaust duct coupled to the turbine, an air plenum coupled to the air inlet, and an air filtration system positioned in said air plenum. The air filtration system includes a plurality of filter elements mounted inside the air plenum, with each filter element including a support structure. The inlet air filtration system also includes a plurality of electrodes positioned proximate the plurality of filter elements, where the electrodes are coupled to a power source which supplies a voltage to the electrodes. The voltage is sufficient to establish an electrostatic field between the electrodes and the filter elements, and sufficient to produce a corona discharge from the electrodes, wherein an amount of current applied to the filter elements is about 0.1 $\mu A/ft^2$ to about 15 $\mu A/ft^2$.

DETAILED DESCRIPTION OF THE INVENTION

Figure 1:
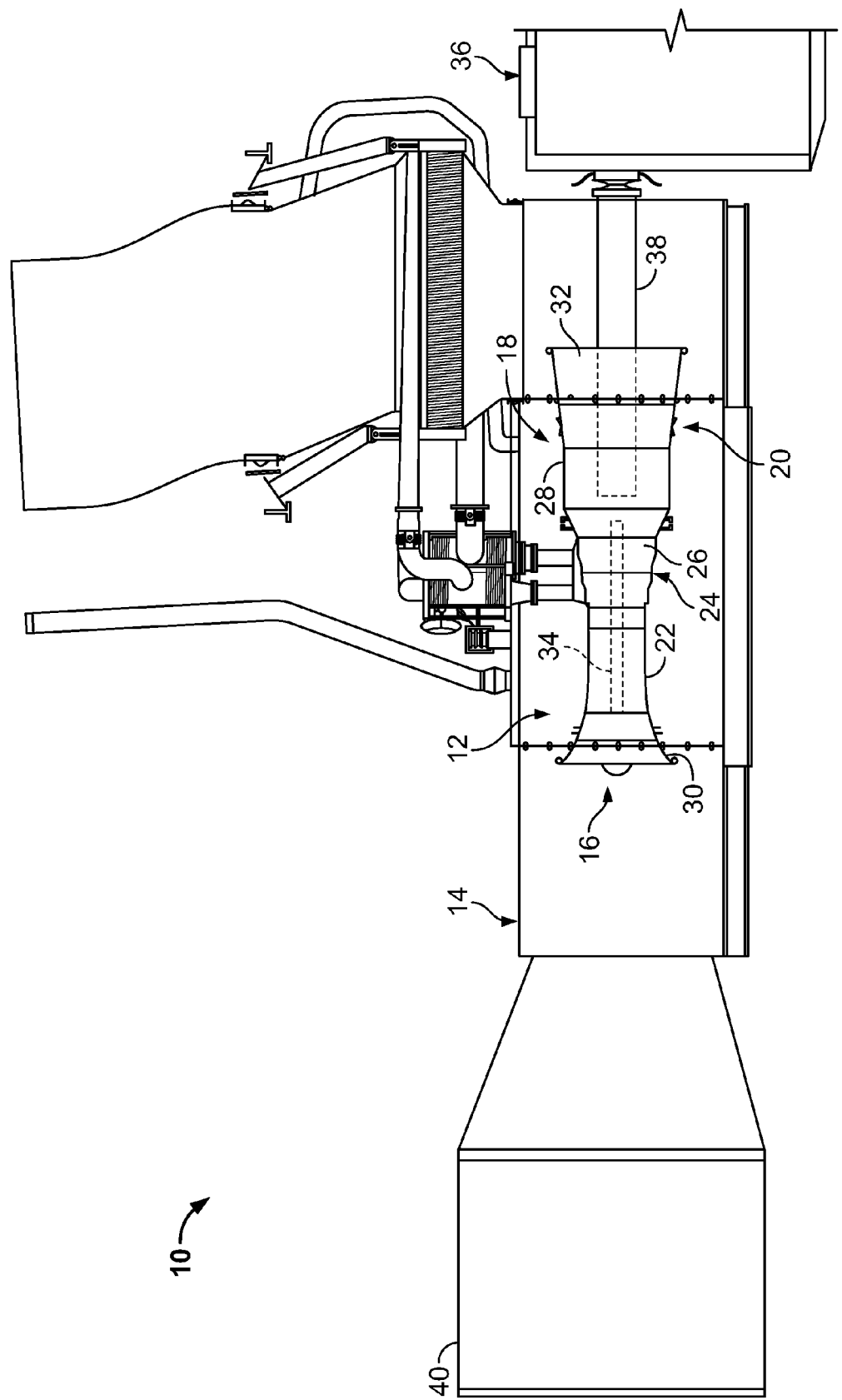
FIG. 1 is a schematic illustration of an exemplary gas turbine engine assembly.

FIG. 1 is a schematic illustration of an exemplary gas turbine engine assembly 10 that includes a turbine engine 12 mounted in a housing 14. Turbine engine 12 includes an inlet portion 16, an engine portion 18, and an exhaust portion 20. Engine portion 18 includes at least one compressor 22, a combustor 24, a high pressure turbine 26, and a low pressure turbine 28 connected serially. Inlet portion 16 includes an inlet 30, and exhaust portion 20 includes an exhaust nozzle 32. Gas turbine engine 12 can be any known turbine engine, for example, in one embodiment, engine 10 is an LM2500 engine commercially available from General Electric Company, Schenectady, N.Y. Of course, engine 10 can be any suitable turbine engine. Compressor 22 and high pressure turbine 26 are coupled by a first shaft 34, and low pressure turbine 28 and a driven load 36, for example, an electric generator, are coupled by a second shaft 38.

In operation, air flows into engine inlet 26 through compressor 22 and is compressed. Compressed air is then channeled to combustor 24 where it is mixed with fuel and ignited. Airflow from combustor 24 drives rotating turbines 26 and 28 and exits gas turbine engine 12 through exhaust nozzle 32.

Figure 2:
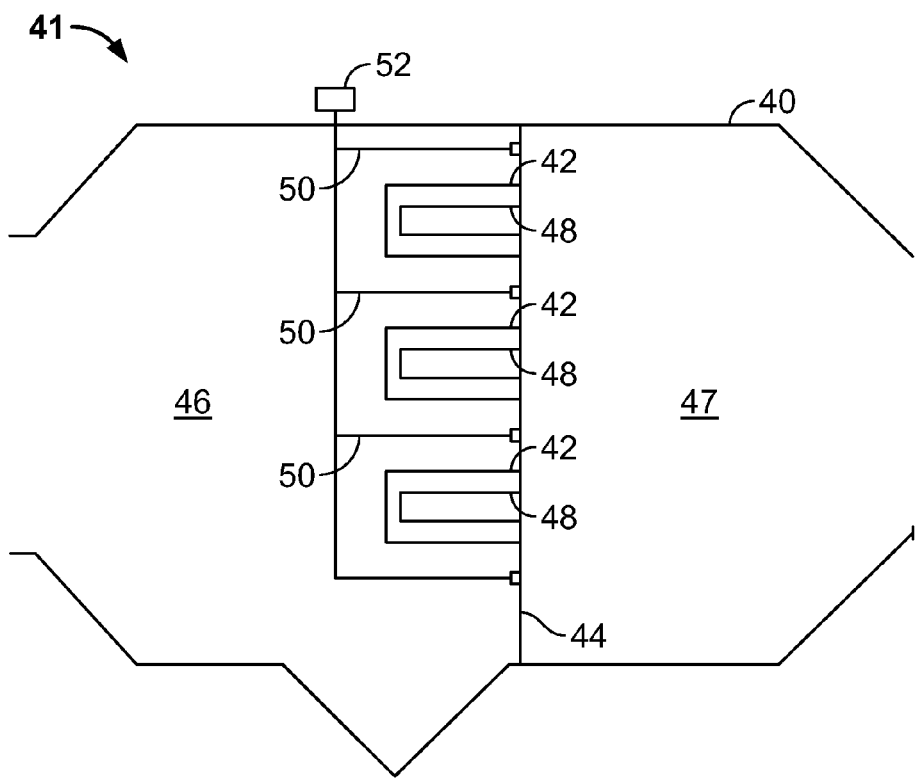
FIG. 2 is a schematic illustration of the plenum shown in FIG. 1 in accordance with an embodiment of the present invention.
Figure 3:
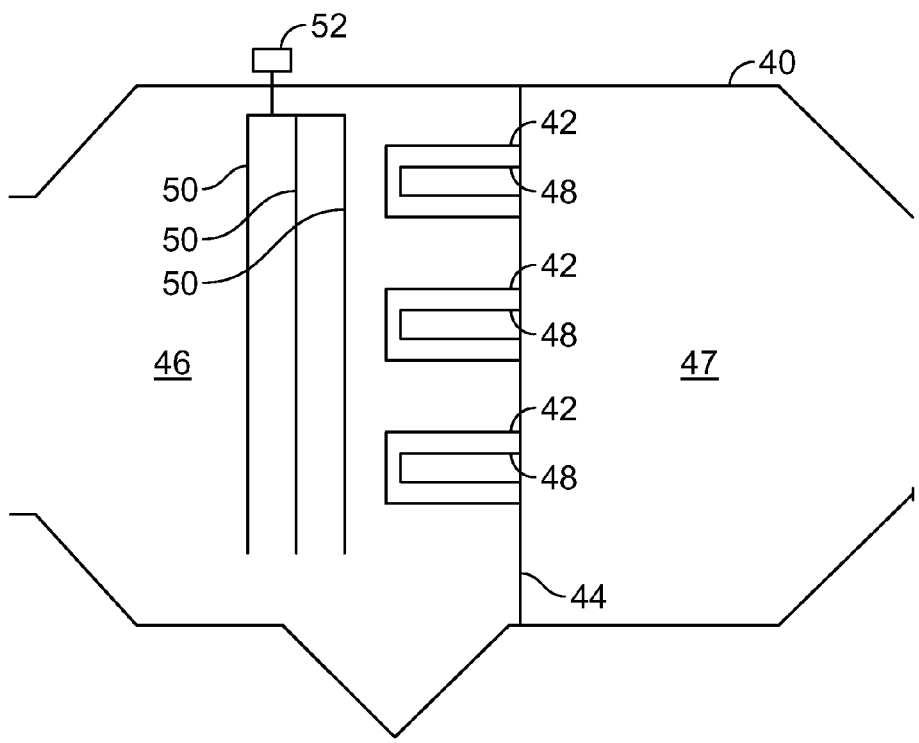
FIG. 3 is a schematic illustration of the plenum shown in FIG. 1 in accordance with another embodiment of the present invention.

Referring also to FIG. 2, an inlet air plenum 40 is operationally coupled to air inlet 30 of engine inlet portion 16. Air plenum 40 houses an air filtration system 41 that includes a plurality of filter elements 42 mounted inside air plenum 40 upstream from air inlet 30 of engine inlet portion 16. Each filter element 42 is mounted on a tube sheet 44. Tube sheet 44 separates a dirty air side 46 of plenum 40 from a clean air side 47 of air plenum 40. Each filter element 42 includes a grounded, electrically conductive support element 48 positioned inside filter element 42. Filter elements 42 can be any suitable filter type, for example, cartridge filters, including pleated cartridge filters, bag filters, and the like. A plurality of discharging electrodes 50 are positioned substantially parallel to filter elements 42 and are interspersed among filter elements 42. In an alternate embodiment, shown in FIG. 3, discharging electrodes 50 are positioned substantially perpendicular to, and upstream from, filter elements 42. Electrodes 50 are electrically coupled to a power source 52 so that an electric field is established between electrodes 50 and support elements 48 when electrodes 50 are energized. The voltage applied to electrodes 50 is sufficient to produce the electric field, and is sufficient to produce a corona discharge from electrodes 50. In one embodiment the voltage is about 5 kV to about 50 kV, and in another embodiment, about 15 kV to about 35 kV. Low current densities are used to produce efficient filtration. In one embodiment, the current density is about $0.1\ \mu A/ft^2$ to about $15\ \mu A/ft^2$, in another embodiment, to about $0.5\ \mu A/ft^2$ to about $10\ \mu A/ft^2$, and in another embodiment, to about $1.0\ \mu A/ft^2$ to about $8.0\ \mu A/ft^2$.

Electrodes 50 polarize incoming dust with a negative charge prior to reaching filter element 42. When the like polarity dust reaches fabric element 42, a more porous dust cake is developed. This increased permeability results from the like charged particles repulsing one another. In this manner, filter element 42 operates at a system pressure drop of about one fourth to one third that experienced in a known pulse jet collector operating at a four to one air-to-cloth ratio.

Figure 4:
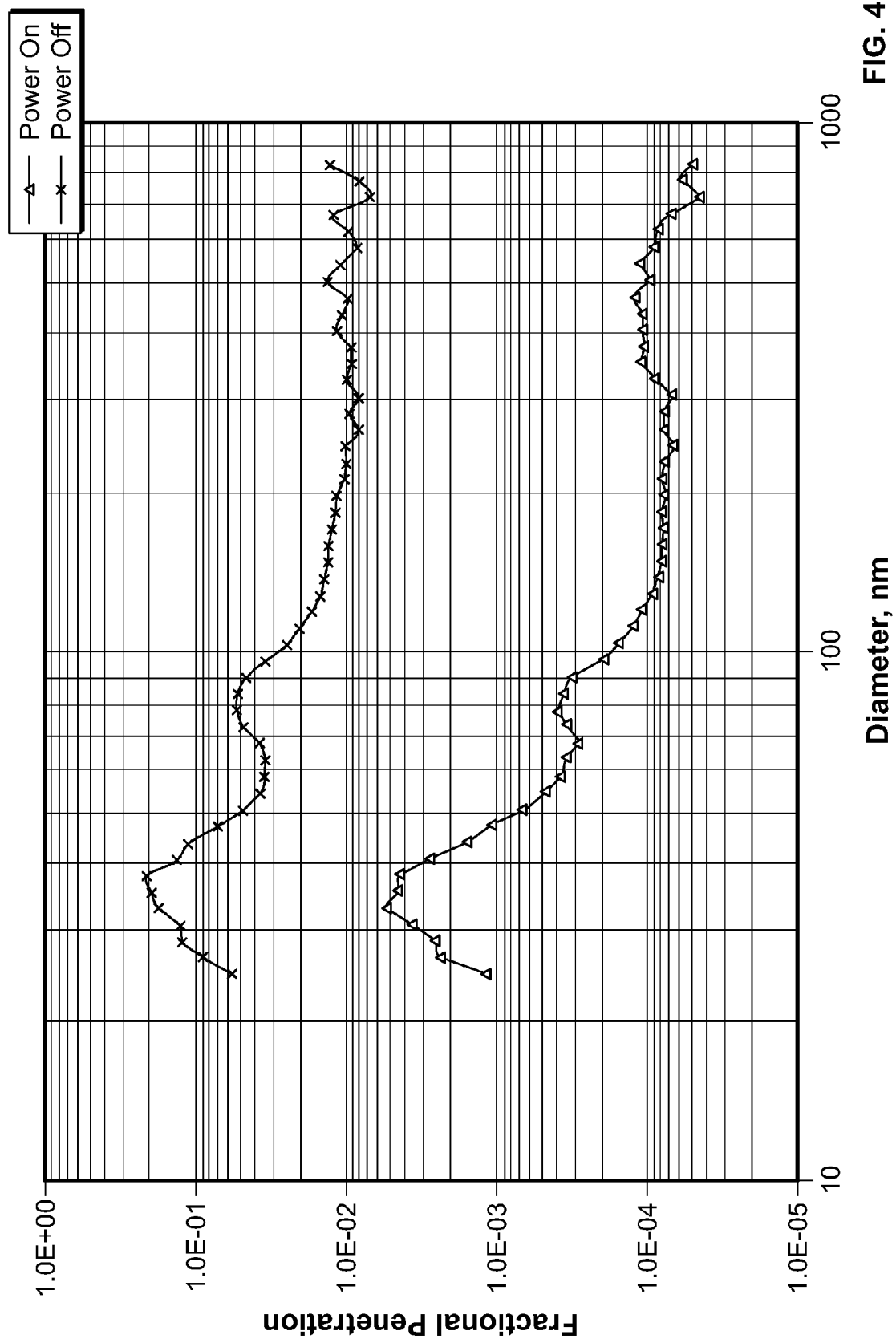
FIG. 4 is a chart that illustrates particle removal efficiency measured with and without an applied electrical field.

The application of an electrical field to the incoming dust also provides increased collection efficiency compared to a conventional pulse jet fabric filter. Dust on filter element 42 causes additional dust to hover over the charged layer. This prevents fine dust from blinding filter element 42, a common cause of system pressure drop increases. FIG. 4 illustrates a chart that reflects the particle removal efficiency measured with and without the applied electrical field. The X-axis reflects particle diameter from 0.01 microns to 1.0 micron while the Y-axis represents the penetration percent (lower numbers are better). The results indicate that when the electrical field is applied, the amount of dust exiting plenum 40 decreases by approximately two orders of magnitude. This reduction in mass emission occurs across the board of particle diameters, but is especially evident when fine dust is considered.

Figure 5:
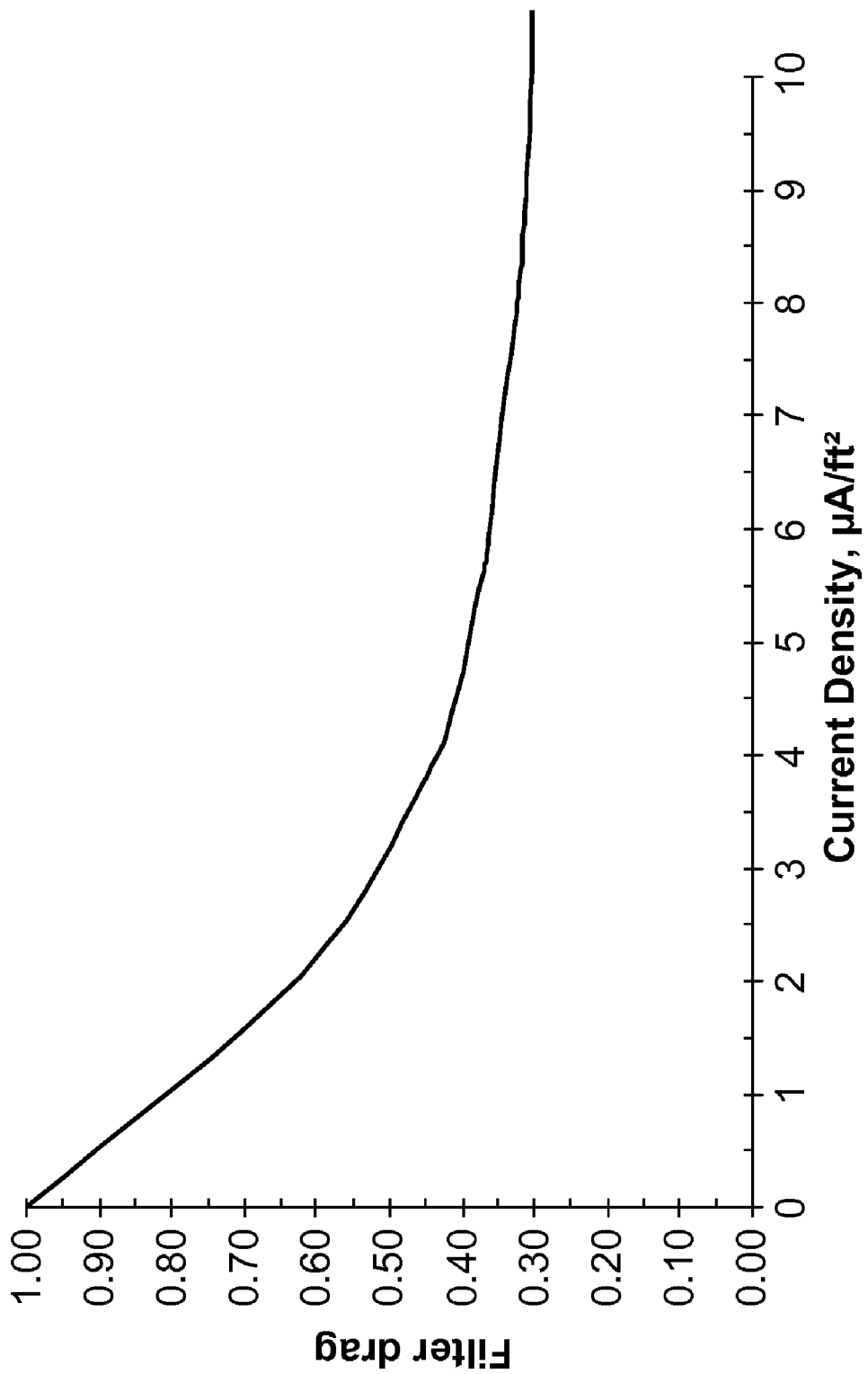
FIG. 5 is a chart of filter drag versus current density of an applied electrical field.

To obtain the collection efficiency and pressure drop benefits shown in FIG. 4, an electrical field is applied to the fabric filter. As shown in FIG. 5, these benefits are derived at very low current densities. The Y-axis shows the filter drag, and the X-axis shows the current density. The term filter drag is an expression of the expected pressure loss in the filter. The maximum pressure loss value is observed when no current is applied to the fabric filter. Once the amount of current applied to the total filter element area reaches a level above $6\ \mu A/ft^2$, the filter drag improvement stabilizes. As a result, the amount of power necessary to derive these benefits is relatively low. The application of the electrical field creates "like" charge particle that repel each other when deposited on the surface of the filter bag. It is believed that application of the electrical field causes fine particles to agglomerate onto coarser particles, thereby, reducing penetration levels of particles into the filter media which facilitates greater gas flow.

Electrodes 50 maintain charge on the dust layer collected at the fabric barrier of filter elements 42. As a result, there is no reliance on reduced dust burden to accomplish high air-to-cloth ratios. In addition, the particle size distribution reaching filter element 42 represents the cross section of the inlet distribution. These two conditions of the above described air filtration system 41 provides for increased efficiency and long term operation. Particularly, air filtration system described above meets the requirements of the industry standard ARAMCO 200 hour air filtration system test. This 200 hour test procedure is described in the Saudi Aramco Materials System Specification 32-SAMSS-008, titled INLET AIR FILTRATION SYSTEMS FOR COMBUSTION GAS TURBINES, issued Oct. 26, 2005, Apendix II, phase 2.

Exemplary embodiments of an air filtration system 41 are described above in detail. Air filtration system 41 is not limited to the specific embodiments described herein, but rather, components of the system may be utilized independently and separately from other components described herein. Also, the above-described system can be implemented and utilized in connection with many other apparatus besides gas turbines.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An inlet air filtration system, said inlet air filtration system comprising:
   an air plenum;
   a plurality of filter elements mounted inside said air plenum, each said filter element comprising a support structure; and
   a plurality of electrodes positioned proximate said plurality of filter elements, each said electrode coupled to a power source which supplies a voltage to said plurality of electrodes, said voltage sufficient to establish an electrostatic field between said plurality of electrodes and said plurality of filter elements, and said voltage sufficient to produce a corona discharge from said plurality of electrodes, wherein an amount of current applied to said plurality of filter elements is about $0.1\ \mu A/ft^2$ to about $15\ \mu A/ft^2$.

2. An inlet air filtration system in accordance with claim 1, wherein said voltage is about 5 kV to about 50 kV.

3. An inlet air filtration system in accordance with claim 1, wherein said voltage is about 15 kV to about 35 kV.

4. An inlet air filtration system in accordance with claim 1, wherein an amount of current applied to said plurality of filter elements is about $0.5\ \mu A/ft^2$ to about $10\ \mu A/ft^2$.

5. An inlet air filtration system in accordance with claim 1, wherein an amount of current applied to said plurality of filter elements is about $1.0\ \mu A/ft^2$ to about $8.0\ \mu A/ft^2$.

6. An inlet air filtration system in accordance with claim 1, wherein said plurality of filter elements comprise a plurality of bag filter elements.

7. An inlet air filtration system in accordance with claim 1, wherein said plurality of filter elements comprise a plurality of tube filter elements.

8. An inlet air filtration system in accordance with claim 1, wherein said plurality of electrodes are positioned substantially parallel to and interspersed among said plurality of filter elements.

9. An inlet air filtration system in accordance with claim 1, wherein said plurality of electrodes are positioned substantially perpendicular to and upstream from said plurality of filter elements.

10. A gas turbine apparatus, said gas turbine apparatus comprising:
    a compressor;
    an air inlet coupled to said compressor;
    a combustor coupled to said compressor;
    a turbine coupled to said combustor;
    an exhaust duct coupled to said turbine;
    an air plenum coupled to said air inlet; and
    an air filtration system positioned in said air plenum, said air filtration system comprising:
    a plurality of filter elements mounted inside said air plenum, each said filter element comprising a support structure; and
    a plurality of electrodes positioned proximate said plurality of filter elements, each said electrode coupled to a power source which supplies a voltage to said plurality of electrodes, said voltage sufficient to establish an electrostatic field between said plurality of electrodes and said plurality of filter elements, and said voltage sufficient to produce a corona discharge from said plurality of electrodes, wherein an amount of current applied to said plurality of filter elements is about 0.1 $\mu A/ft^2$ to about 15 $\mu A/ft^2$.

11. A gas turbine apparatus in accordance with claim 10, wherein said voltage is about 5 kV to about 50 kV.

12. A gas turbine apparatus in accordance with claim 10, wherein said voltage is about 15 kV to about 35 kV.

13. A gas turbine apparatus in accordance with claim 10, wherein an amount of current applied to said plurality of filter elements is about 0.5 $\mu A/ft^2$ to about 10 $\mu A/ft^2$.

14. A gas turbine apparatus in accordance with claim 10, wherein an amount of current applied to said plurality of filter elements is about 1.0 $\mu A/ft^2$ to about 8.0 $\mu A/ft^2$.

15. A gas turbine apparatus in accordance with claim 10, wherein said plurality of filter elements comprise a plurality of bag filter elements.

16. A gas turbine apparatus in accordance with claim 10, wherein said plurality of filter elements comprise a plurality of tube filter elements.

17. A gas turbine apparatus in accordance with claim 10, wherein said plurality of electrodes are positioned substantially parallel to and interspersed among said plurality of filter elements.

18. A gas turbine apparatus in accordance with claim 10, wherein said plurality of electrodes are positioned substantially perpendicular to and upstream from said plurality of filter elements.

* * * * *